Feb. 5, 1957  J. G. RUSSELL  2,780,504
ACCUMULATOR PISTON
Filed April 21, 1954
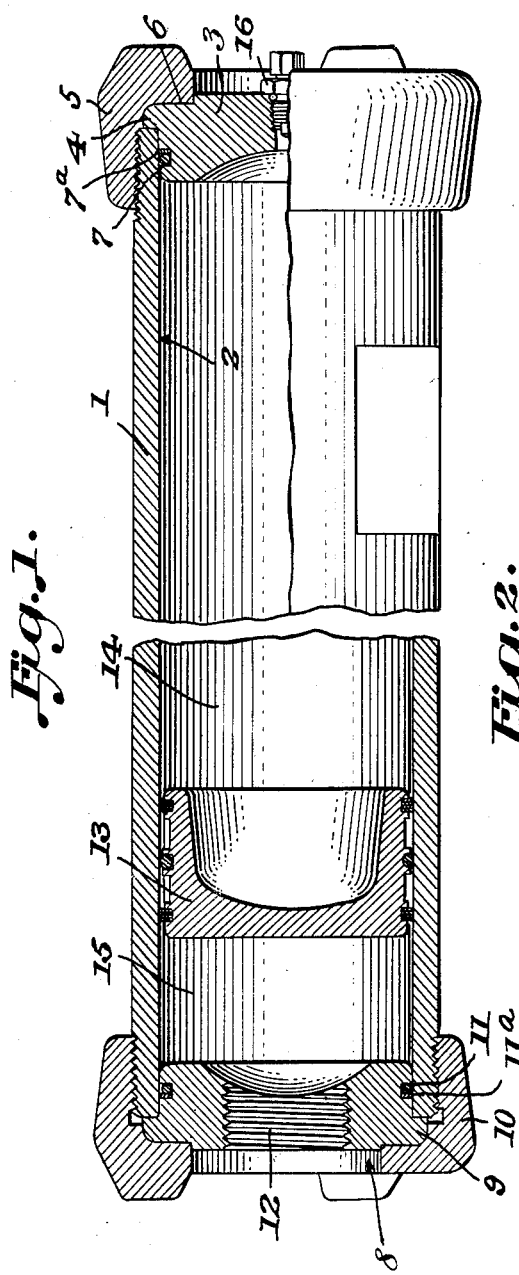
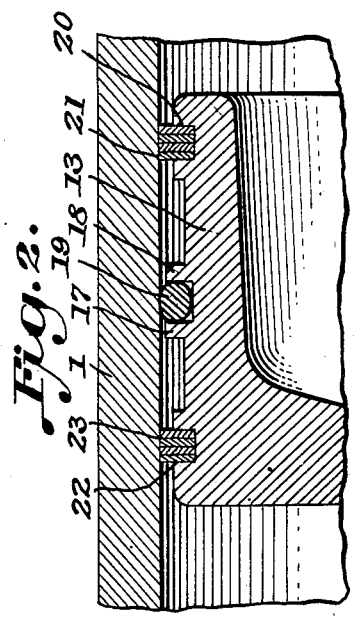
INVENTOR.
John G. Russell,
BY
Mason, Porter, Diller & Stewart
ATTYS.

United States Patent Office 2,780,504
Patented Feb. 5, 1957

2,780,504

ACCUMULATOR PISTON

John G. Russell, Mayfield Heights, Ohio, assignor to The Parker Appliance Company, Cleveland, Ohio, a corporation of Ohio Application April 21, 1954, Serial No. 424,628

4 Claims. (Cl. 309—4)

The invention relates to improvements in an accumulator of the floating piston type wherein the piston is moved freely in the cylinder by a differential in the pressure on opposite sides thereof.

An object of the invention is to provide a piston for an accumulator of the above type wherein a sealing means for the piston is disposed midway between the ends of the piston and is so constructed that the sealing member is closely confined in a groove in the piston, the walls of which groove have a minimum clearance with the wall of the cylinder.

A further object of the invention is to provide the piston with a sealing means of the above type disposed midway between the ends thereof and with plastic supporting devices disposed in grooves adjacent the ends of the piston which plastic supporting devices make contact with the cylinder wall and prevent the piston from cocking in its movements and the metal of the piston contacting the metal of the cylinder wall.

A further object of the invention is to provide the piston with a sealing means disposed intermediate the ends thereof which sealing means includes an O-ring closely confined in a groove under compression at its inner and outer surfaces and in light contact with the sides of the groove.

A further object of the invention is to provide a piston of the above type with a sealing means disposed midway between the ends thereof including an O-ring confined in a groove in the piston and plastic rings disposed in grooves adjacent the ends of the piston which rings are of a plastic having a low coefficient of friction so as to permit the piston to move freely and which rings are rigid so as to prevent the piston from cocking in its movements.

In the drawings, which show by way of illustration one embodiment of the invention, Figure 1 is a view partly in side elevation and partly in vertical section of an accumulator embodying the invention.

Figure 2 is an enlarged longitudinal sectional view showing more clearly the means for sealing and supporting the piston for free movement in the body portion of the accumulator.

The accumulator as shown includes a body portion 1, preferably of a corrosion-resistant alloy steel. Said body portion has a bore 2 extending from end to end of the body portion which bore is cylindrical and of uniform diameter throughout. There is a closure means at each end of the body portion. The closure means at the right in Figure 1 includes a header 3 telescoping within said bore and having a projecting portion 4 which overlies and contacts the end of the body portion 1. This header is held in place by a clamping ring 5 having a portion 6 thereof which overlies the header and forces the same into a tight engagement with the end of the body portion when said ring is threaded onto the body portion. The header is sealed by means of an O-ring 7 disposed in a circumferential groove in the header. At the outside of the O-ring is a washer 7ª of leather or the like.

At the other end of the body portion is a header 8, which telescopes within the body portion and has a laterally projecting portion 9 engaging the end of the body wall. This header 8 is held on the body by means of a clamping ring 10. The header is sealed to the body by means of an O-ring 11, with which is associated a leather ring 11ª. Centrally of this header 8 is an opening 12 which is threaded for the attachment of a pipe connected to a hydraulic system. Disposed within the body portion 1 is a floating piston 13 which divides the body portion of the accumulator into a compressed gas chamber 14 and a fluid chamber 15. This piston is preferably made of aluminum. The gas chamber 14 is put under gas pressure through a valve 16. The piston moves freely in the cylindrical bore as the differential pressure between the chambers 14 and 15 vary. The operation of the accumulator is well known and further description thereof is not thought necessary.

The particular novel feature of the present invention has to do with the means for supporting and sealing the piston. There is a circumferential groove midway between the ends of the piston 13 having parallel walls 17 and 18. These walls extend outwardly close to the cylindrical wall of the body portion but has no contact therewith. The clearance is as small as is practical to maintain from a production standpoint. Disposed in this groove is an O-ring 19 which is dimensioned so that it is closely confined in its groove and is under initial compression at its inner and outer surfaces. The side surfaces of the O-ring make light contact with the side walls of the groove. The purpose of the small clearance between the walls of the groove and the inner surface of the body is to confine the O-ring when there is a higher fluid pressure on one side of the piston than the other. If the clearance was larger then O-ring might extrude into it and result in a damaged ring and leakage.

Adjacent each end of the piston is a supporting means for the piston which supporting means makes light contact with the wall of the body portion of the accumulator.

At the right hand end of the piston there is a circumferential groove 20 and disposed in the groove are rings 21. These rings are preferably of one piece having several loops or there may be single split rings placed side by side. The material chosen for the rings should be rigid enough to give proper support to the piston and prevent it from cocking as it moves along the inner wall of the body portion. The rings also should have a very low coefficient friction in order that the piston may move freely under a differential in the pressure at opposite sides thereof. One material which is found to possess the desired qualities of rigidity and low coefficient of friction is polyfluorethylene commonly known as Teflon. There are other plastics which may be used depending upon the use to which the accumulator is to be employed but it is essential that the rings shall be sufficiently rigid to prevent cocking of the piston and the contact of the metal of the piston with the metal wall of he body portion and it is also essential that the plastic shall be of sufficiently low coefficient of friction as to permit freedom of movement of the piston in the body of the accumulator. At the opposite end of the piston there is a groove 22 containing rings 23 of plastic material and these rings contact with the wall of the cylinder and it is by the cooperation between the rings 21 and 23 that the piston is prevented from cocking in either direction so as to bring about metal contact between the wall of the piston and the body wall of the accumulator. The ends of the walls of the grooves 20 and 22 are spaced away from the inner surface 2 of the body wall so as to insure no metal contact even with a slight cocking of the piston. This clearance can be made much greater than the clearance between the walls 17, 18 and the wall of the body portion for the reason that the plastic rings are rigid and not capable of being deformed as occurs with rubber. Furthermore, these plastic rings function as a support for the piston and not necessarily as a sealing means.

When the sealing means is located midway between the ends of the piston and the supporting means for the piston adjacent the ends thereof the piston will move freely under any differential pressure at the opposite sides of the piston and a sealing means for the piston is provided which is not likely to be disturbed by even excessive variation in the pressure at opposite sides of the piston.

It is obvious that minor changes in the details of construction and the arrangement of the parts may be made without departing from the spirit of the invention as set forth in the appended claims.

I claim:

1. A floating piston for the cylinder of an accumulator comprising a generally cylindrical body having two spaced walls forming an annular groove intermediately of the ends thereof, said walls being of a diameter for closely fitting within the cylinder, a sealing gasket confined in said groove and in sealing contact with the cylinder, said body also having an annular groove in its outer surface adjacent each end thereof and defined between two spaced walls extending outwardly toward but spaced inwardly from the cylinder a greater distance than the intermediately positioned walls, and plastic ring means in each of the two last mentioned grooves and contacting in the base of each said groove and with the cylinder to hold the piston centered in the cylinder and being rigid and of low coefficient of friction so as to permit free movement of the piston within the cylinder while preventing cocking thereof about the intermediate contact of the gasket with the cylinder.

2. Structure as defined in claim 1 wherein each of the plastic ring means is composed of a plurality of flat ring portions lying face to face.

3. Structure as defined in claim 1 wherein each of the plastic ring means is composed of polyfluorethylene.

4. Structure as defined in claim 1 wherein each ring means is composed of polyfluorethylene and is in the form of flat strip material shaped into multiple coils lying face against face in the respective groove and contacting the groove defining end walls at the end faces thereof.

References Cited in the file of this patent

UNITED STATES PATENTS

| | | |
|---|---|---|
| 1,145,733 | Wright | July 6, 1915 |
| 1,963,151 | Russell | June 19, 1934 |
| 2,342,775 | Whitney et al. | Feb. 29, 1944 |
| 2,352,041 | Van Den Berg | June 20, 1944 |
| 2,388,422 | Krastel | Nov. 6, 1945 |
| 2,440,065 | Ashton | Apr. 20, 1948 |
| 2,476,021 | Bender | July 12, 1949 |